United States Patent
Ho et al.

(10) Patent No.: US 6,947,730 B2
(45) Date of Patent: Sep. 20, 2005

(54) METHOD ENABLING MOBILE TELEPHONES TO HAVE AUTOMATIC MULTIPLE TELEPHONE NUMBER DIALING CAPABILITY TO A SAME CALLED PARTY

(75) Inventors: David Ho, Taipei Hsieng (TW); Yong-Jun Feng, Shanghai (CN)

(73) Assignee: Inventec Appliances Corp., Taipei Hsieng (TW)

( * ) Notice: Subject to any disclaimer, the term of this patent is extended or adjusted under 35 U.S.C. 154(b) by 434 days.

(21) Appl. No.: 10/180,347

(22) Filed: Jun. 27, 2002

(65) Prior Publication Data

US 2004/0204119 A1 Oct. 14, 2004

(51) Int. Cl.[7] .......................... H04M 3/42; H04Q 7/20; H04B 1/38
(52) U.S. Cl. .................. 455/417; 455/414; 455/412.1; 455/418; 455/461; 455/463; 455/566; 379/211.01; 379/211.02; 379/207.04; 379/207.05; 379/207.06
(58) Field of Search ................................. 455/417, 414, 455/412.1, 418, 461, 463, 566; 379/211.01, 211.02, 207.04–207.06

(56) References Cited

U.S. PATENT DOCUMENTS

| 6,671,508 B1 | * | 12/2003 | Mitsuoka et al. | ......... 455/412.1 |
| 6,792,082 B1 | * | 9/2004 | Levine | ....................... 379/67.1 |
| 6,795,377 B2 | * | 9/2004 | Gorden | ......................... 368/12 |

* cited by examiner

Primary Examiner—Nick Corsaro
Assistant Examiner—Wen Huang
(74) Attorney, Agent, or Firm—Bacon & Thomas, PLLC

(57) ABSTRACT

The invention is to provide a method enabling mobile telephones to have automatic multiple telephone number dialing capability to a same called party consisting of establishing a database recording a plurality of telephone numbers of a called party set by a user in a telephone directory stored in a memory of a mobile telephone; automatically searching the said database to determine whether the said called party has other telephone numbers when detecting that the line of one telephone number of the said called party being dialed is busy; and listing all the other telephone numbers in the said database belonging to the said called party on a screen of the mobile telephone for selectable dialing, thereby effectively reducing the time spent on user searches for other telephone numbers as well as the annoying dialing of other telephone numbers.

4 Claims, 2 Drawing Sheets

| Name | Data Type | Duration |
|---|---|---|
| Home Telephone Number | Character | 16 |
| Company Telephone Number | Composite | 24 |
| Mobile Telephone Number | ...... | .... |
| ............ | ...... | .... |

METHOD ENABLING MOBILE TELEPHONES TO HAVE AUTOMATIC MULTIPLE TELEPHONE NUMBER DIALING CAPABILITY TO A SAME CALLED PARTY

BACKGROUND OF THE INVENTION

1) Field of the Invention

The invention herein relates to a method enabling mobile telephones to have automatic multiple telephone number dialing capability to a same called party.

2) Description of the Prior Art

As telecommunications network technology advances, compact, full function, and low-priced mobile telephone (or handheld telephones) products are in great demand among increasingly more people and have become one of the most commonly seen communications tools. Since users can immediately exchange information with friends or business partners through the said mobile telephones, the said mobile telephones provides more convenience, rapidity, and other advantages than conventional landline telephones.

Although the said mobile telephones can now supplant conventional landline telephone inconveniences and the storage space of the their telephone directory functions are considerably expanded, the said telephone directory functions still have some less than ideal utilization aspects. For example, since the location of every user is often different and there are other various factors such as having at the same time multiple personal telephone numbers, including home telephone numbers, company telephone numbers, mobile telephone numbers, and so on, when the user needs to utilize the called party information of the said telephone directory functions to execute a dial-up connection with a called party and a busy line occurs on one of the multiple telephone numbers of the called party dialed, the multiple personal telephone numbers possessed by the called party often leaves the user the tiring, time consuming, and bothersome task of repeatedly searching for other telephone numbers of the called party and, as a result, fails to achieve party-to-party communications during the first attempt. As such, the said annoyance is a problem that awaits a solution.

For this reason, if manufacturers design a novel mobile telephone product having a method that is capable of automatically dialing multiple telephone numbers set by the user belonging to the same called party without requiring the user to search for other multiple telephone numbers of the said called party and thereby provide an ergonomic multiple number dialing method which is a more convenient and practical, such an approach would be happily accepted by the general public.

SUMMARY OF THE INVENTION

In view of the said annoying drawbacks attributed to user location differences and the possessing at the same time of multiple personal telephone numbers that require the user to utilize the called party information in the telephone directory functions of a mobile telephone to execute a dial-up connection with a called party, but when a busy line occurs on one of the multiple telephone numbers of the called party dialed and results in a tiring and repeated search of called party telephone numbers during the contact process, the inventor of the invention herein researched and developed the present invention following many years of actual experience and investigative studies, the invention herein providing a method capable of automatically dialing multiple telephone numbers set by the user belonging to the same called party, without requiring the user to search for other multiple telephone numbers of the said called party.

The objective of the invention herein consists of telephone directory functions stored in the memory of a mobile telephone and establishing a database, the said database utilized to save the telephone numbers of called parties set by the user and thereby record the telephone numbers of the said called parties such that when the central processing unit of the said mobile telephone detects a dialing signal to a called party by the user and then detects that the line of the dialed telephone number is busy, the automatic dialing multiple telephone number processing procedures of the invention herein are executed, wherein a selected telephone numbers among the other multiple telephone numbers belonging to a same called party are automatically re-dialed repeatedly in sequence to increase answering probability without requiring user searching, thereby effectively reducing the time spent on user searches for other multiple telephone numbers as well as the annoying dialing of multiple telephone numbers and, furthermore, ensuring the objective of establishing party-to-party communications during the first attempt.

The above and other objects, features and advantages of the present invention will become apparent from the following detailed description taken with the accompanying drawings.

DETAILED DESCRIPTION OF THE INVENTION

Figures 1, 2:
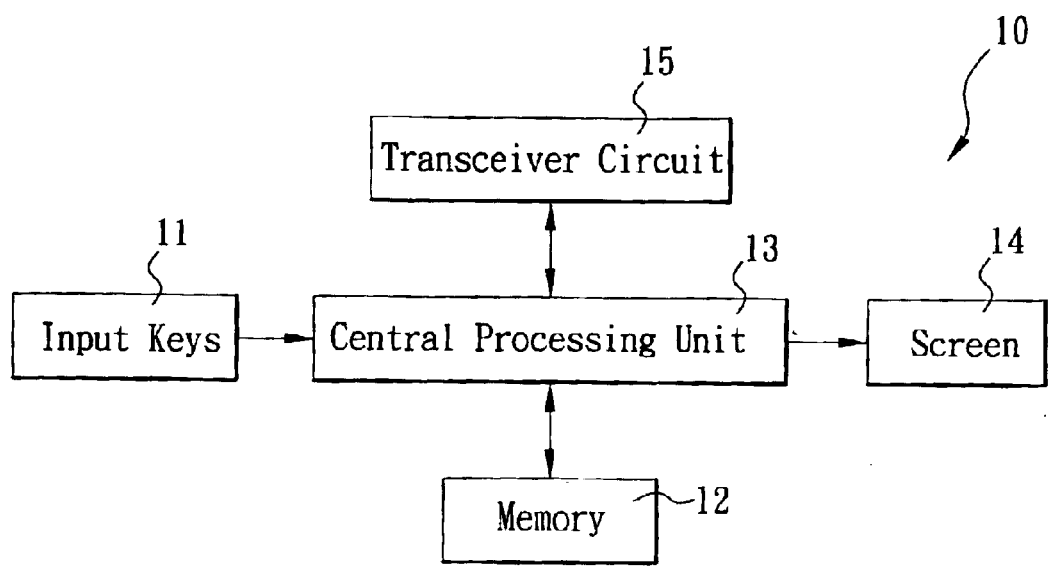
FIG. 1 is a system layout block diagram of the invention herein.
FIG. 2 is a diagram of the archiving structure of the telephone directory functions in the memory of the invention herein.

In the invention herein, referring to FIG. 1 and FIG. 2, since users today often have a plurality of personal telephone numbers to remember, they store them as a measure of practical necessity in a mobile telephone 10, the telephone directory functions of which includes called party contact information; however, when the calling party or user encounters a busy line after dialing one of the multiple telephone numbers of a called party, the user is faced with the tiresome task of repetitiously searching for the other telephone numbers of the called party and, as such, the user fails to achieve party-to-party communications during the first attempt.

The invention herein addresses such problems through the innovation of a method enabling mobile telephones to have automatic multiple telephone number dialing capability to a same called party; the said method consists of telephone directory functions stored in the memory 12 of a mobile telephone 10 and establishing a database 121, the said database 121 utilized to archive the telephone numbers of called parties set by the user and thereby record the telephone numbers of the said called parties such that after the central processing unit 13 of the said mobile telephone 10 detects a dialing signal to a called party entered by the user through input keys 11, the dial-up connection is accomplished according to one of the set multiple telephone numbers; when it is detected that the line of a dialed telephone number is busy, an automatic search of the said database 121 is undertaken by the said central processing unit 13 and the other multiple telephone numbers of the said called party are automatically listed on a screen 14 to provide for the user-selectable dialing of the said other multiple telephone numbers, thereby effectively reducing the time spent on repeated, wearying, and bothersome user searches for other multiple telephone numbers of called parties and, furthermore, ensuring the objective of establishing party-to-party communications during the first attempt.

In the invention herein, referring to FIG. 1 and FIG. 2, the said mobile telephone 10 is respectively comprised of the said input keys 11 utilized to provide the user with a means for setting and inputting operations; the said memory 12 utilized to retain information entered into the said database 121; the said central processing unit 13 utilized to search database 121 information in the said memory 12 and, furthermore, execute an analysis of the data found to provide for the corresponding action; a screen 14 (in the present invention, a liquid crystal display) utilized for displaying data frames, the said data frames providing for a user-selectable dialing table of multiple telephone numbers and other related information; and a transceiver circuit 15 utilized for the reception and transmission of dialing signals.

Referring to FIG. 2, the archiving structure of the database 121 in the said memory 12 of the invention herein respectively consists of a name/full name column, a data type (character/composite) column, and a duration column contained in the said database 121, wherein each group of called party data is arranged in consecutive order and, furthermore, the multiple telephone number data of each said called party is in a sequence determined by the user, with the said multiple telephone numbers including a minimum of one home telephone number, company telephone number, or mobile telephone number, and so forth.

Figure 3:
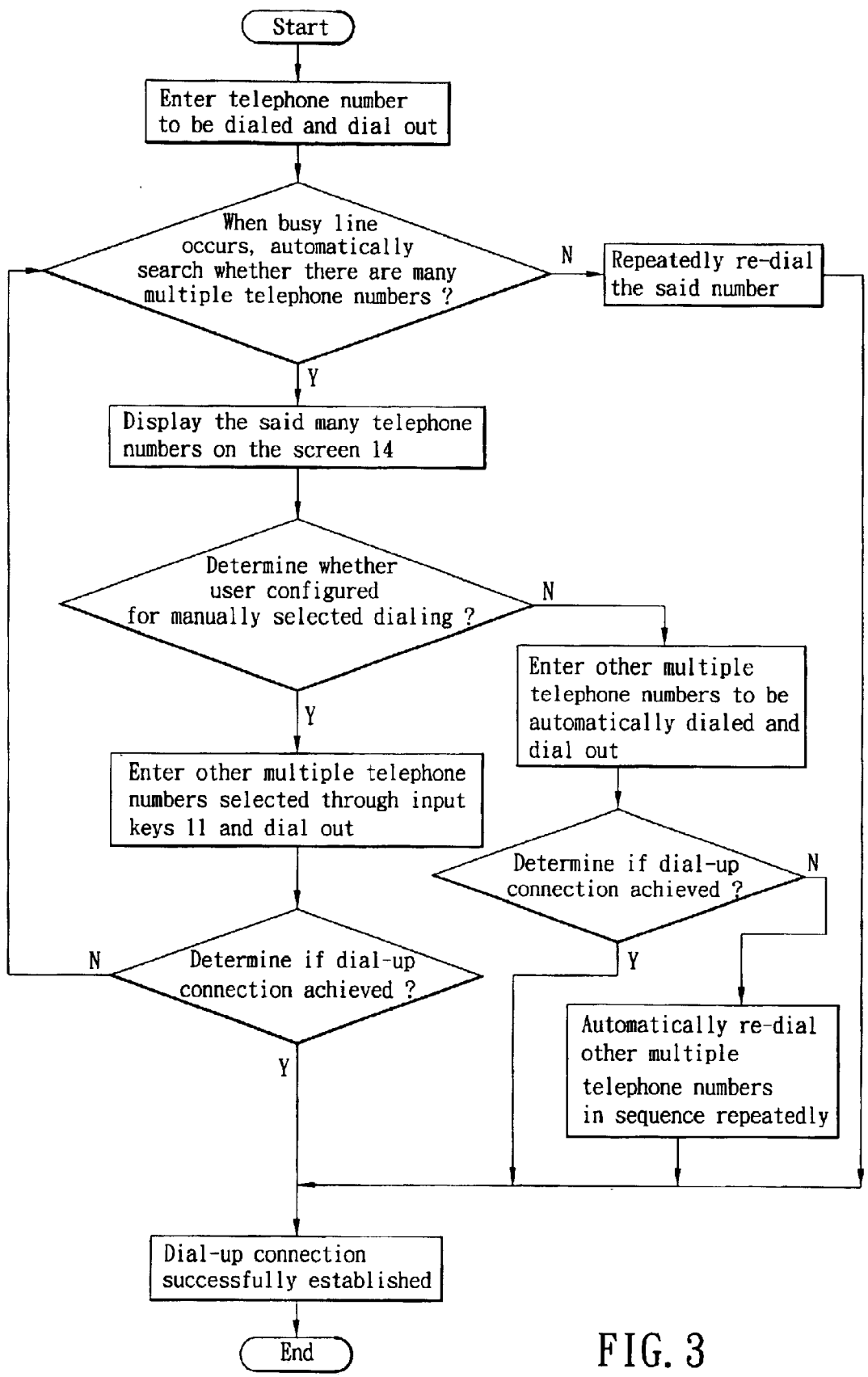
FIG. 3 is a flowchart of the multiple telephone number automatic dialing program of the invention herein.

In the invention herein, after the user enters the multiple telephone number data of a same called party by pressing the input keys 11, the said mobile telephone 10 central processing unit 13 saves it in the said memory 12 according to the database 121 archiving structure settings and thereafter, when a dialing signal inputted by the user is detected, processing is executed according to the following procedures, as indicated in FIG. 3.

(1) First, the telephone number of a called party dialed by the user is entered and transmitted as a signal from the said transceiver circuit 15.

(2) When it is detected that the line of the telephone number dialed is busy, the said database 121 is automatically searched to determine whether the said called party has multiple telephone numbers.

If the said called party has multiple telephone numbers, then all the multiple telephone numbers belonging to the said called party are listed on the said screen 14 to provide for user-selectable dialing and continuation to step (3).

Otherwise, if the said called party does not have multiple telephone numbers, then the said number is re-dialed repeatedly to increase answering probability until the call is answered.

(3) Based on the said memory 12 settings, it is determined whether the said multiple telephone numbers are configured for manual user-selectable dialing.

If configured for manual user-selectable dialing, then the user selects and enters the other telephone number by pressing the said input keys 11 (such as the up and down keys), which is thereafter transmitted as a signal from the said transceiver circuit 15 and, furthermore, the process continues to step (4).

Otherwise, if preset for automatic dialing, then the said other telephone number is entered and automatically dialed and transmitted as a signal from the said transceiver circuit 15 and, furthermore, the process continues to step (5).

(4) When a busy line is detected after dialing, the procedure returns to step (2).

Otherwise, no busy line indicates a successful dial-up connection.

(5) When a busy line is detected after dialing, the said database 121 is searched for other telephone numbers which are then sequentially re-dialed repeatedly until a successful connection is achieved.

Otherwise, no busy line indicates a successful dial-up connection.

As such, the invention herein allow the user to dial all the said called parties according to the database 121 previously set-up and saved in the said memory 12 and when the one of the multiple telephone numbers of the called party is busy, the said processing procedures are executed, wherein selecting a telephone number automatically results in the sequential re-dialing of the other telephone numbers of the same called party to increase answering probability without requiring user searching, thereby effectively reducing the time spent on user searches for other multiple telephone numbers as well as the annoying dialing of multiple telephone numbers and, furthermore, ensuring the objective of establishing party-to-party communications during the first attempt.

While the invention has been described by means of specific embodiments, numerous modifications and variations could be made thereto by those skilled in the art without departing from the scope and spirit of the invention set fort.

What is claimed is:

1. A method enabling mobile telephones to have automatic multiple telephone number dialing capability to a same called party, said method establishing a database in a telephone directory stored in a memory of a mobile telephone and, said database being utilized to record a plurality of telephone numbers of a called party set by a user, such that when a central processing unit of said mobile telephone detects a dialing signal to said called party, said central processing unit executes the following procedures:

automatically searching said database to determine whether said called party has other telephone numbers when detecting that the line of one telephone number of said called party being dialed is busy;

listing all the other telephone numbers in said database belonging to said called party on a screen of the mobile telephone for selectable dialing, wherein said mobile telephone further comprises a plurality of input keys utilized for configuration and inputting operations, and a transceiver circuit utilized for reception and transmission of dialing signals, and wherein:

said memory is utilized to record information entered into said database, said central processing unit is utilized to search data in said database and, furthermore, to execute an analysis of said data found to provide for the corresponding procedures, said screen is utilized for displaying said data in a frame of a user-selectable dialing table comprising multiple telephone numbers and other related information, said dialing table respectively consists of a name/full name column, a data type column, and a duration column, each group of a plurality of said called parties is arranged in consecutive order, and said plurality of telephone numbers of each said called party is in a sequence determined by the user, with said telephone numbers including at least one home telephone number, company telephone number, or mobile telephone number.

2. A method enabling mobile telephones to have automatic multiple telephone number dialing capability to a same called party as claimed in claim 1, in which when said central processing unit of said mobile detects a dialing signal, said procedures further comprise:

transmitting the telephone number of a called party dialed by the user as a signal from said transceiver circuit;

automatically searching said database to determine whether said called party has other telephone numbers and listing all other telephone numbers belonging to said called party on said screen for user-selectable dialing when detecting that the line of the telephone number being dialed is busy, based on said memory settings, determining whether said other telephone numbers are configured for manual user-selectable dialing, and transmitting one of said other telephone numbers selected by the user through pressing said input keys as a signal from said transceiver circuit;

repeating said procedures when a busy line is detected after dialing until a successful connection is achieved; otherwise, indicating a successful dial-up connection.

3. A method enabling mobile telephones to have automatic multiple telephone number dialing capability to a same called party as claimed in claim 2, in which when a busy line occurs after dialing, said central processing unit executes the procedure of automatically searching said database to determine whether said called party has said other telephone numbers; if there is no other telephone number, then re-dialing the same telephone number repeatedly to increase answering probability until the call is answered.

4. A method enabling mobile telephones to have automatic multiple telephone number dialing capability to a same called party as claimed in claim 2, in which upon determining, based on said memory settings, that said other telephone numbers were previously configured for automatic dialing, said central processing unit executes the procedures of automatically dialing said other telephone numbers sequentially, and transmitting said other telephone number being dialed as a signal from said transceiver circuit until a successful dial-up connection is achieved.

* * * * *